United States Patent
Shah et al.

(10) Patent No.: US 7,308,384 B2
(45) Date of Patent: Dec. 11, 2007

(54) ORDERED RECORD OF SYSTEM-WIDE FAULT IN AN HVAC SYSTEM

(75) Inventors: Rajendra K. Shah, Indianapolis, IN (US); Chris Puranen, Noblesville, IN (US)

(73) Assignee: Carrier Corporation, Syracuse, NY (US)

( * ) Notice: Subject to any disclaimer, the term of this patent is extended or adjusted under 35 U.S.C. 154(b) by 215 days.

(21) Appl. No.: 10/842,373

(22) Filed: May 10, 2004

(65) Prior Publication Data

US 2005/0159924 A1 Jul. 21, 2005

Related U.S. Application Data

(60) Provisional application No. 60/537,765, filed on Jan. 20, 2004.

(51) Int. Cl.
*G05B 13/00* (2006.01)

(52) U.S. Cl. .............. 702/183; 700/275; 700/276; 62/127; 62/129; 62/181; 340/310.11

(58) Field of Classification Search .............. 702/99, 702/105, 130, 182–185, 188, 82; 700/9, 700/274, 276, 278, 282, 299, 300, 275; 340/3.1, 340/3.3, 500, 310.11, 310.17, 538, 538.16, 340/588, 584, 585, 870.17; 62/127, 129, 62/181; 236/51, 94, 15 BG
See application file for complete search history.

(56) References Cited

U.S. PATENT DOCUMENTS

| | | | | |
|---|---|---|---|---|
| 5,222,888 A | * | 6/1993 | Jones et al. .............. 431/20 |
| 5,417,243 A | * | 5/1995 | Ragona .............. 137/625.19 |
| 5,481,481 A | * | 1/1996 | Frey et al. .............. 702/82 |
| 5,555,269 A | | 9/1996 | Friday, Jr. et al. |
| 5,706,191 A | * | 1/1998 | Bassett et al. .............. 700/9 |
| 5,751,572 A | | 5/1998 | Maciulewicz |
| 5,801,940 A | * | 9/1998 | Russ et al. .............. 700/9 |
| 5,818,347 A | | 10/1998 | Dolan et al. |
| 6,179,214 B1 | | 1/2001 | Key et al. |
| 6,223,544 B1 | * | 5/2001 | Seem .............. 62/127 |
| 6,535,138 B1 | | 3/2003 | Dolan et al. |
| 6,667,690 B2 | | 12/2003 | Durej et al. |

(Continued)

FOREIGN PATENT DOCUMENTS

| | | |
|---|---|---|
| EP | 1 335 166 | 8/2003 |
| WO | 02/056540 | 7/2002 |

OTHER PUBLICATIONS

U.S. Appl. No. 60/466,285.*
U.S. Appl. No. 60/527,903.*
European Search Report dated Feb. 26, 2007.

*Primary Examiner*—Carol S. W. Tsai
(74) *Attorney, Agent, or Firm*—Carlson, Gaskey & Olds

(57) ABSTRACT

An HVAC system includes a central controller which communicates with a multiple of HVAC components over a digital communication bus. The central controller maintains an ordered fault list that includes the source of a fault, a description of the fault, the last occurrence of the fault, and the number of sequential occurrences, or repetitions across the entire HVAC system.

22 Claims, 2 Drawing Sheets

U.S. PATENT DOCUMENTS

| | | | |
|---|---|---|---|
| 6,691,064 B2* | 2/2004 | Vroman | 702/183 |
| 6,826,454 B2* | 11/2004 | Sulfstede | 700/276 |
| 2002/0163447 A1* | 11/2002 | Runyon et al. | 340/947 |
| 2003/0060933 A1* | 3/2003 | Sulfstede | 700/276 |
| 2004/0230402 A1* | 11/2004 | St. Jean | 702/189 |
| 2005/0125102 A1* | 6/2005 | Nichols et al. | 700/276 |
| 2005/0159846 A1* | 7/2005 | Van Ostrand et al. | 700/276 |

* cited by examiner

| # | SOURCE | FAULT | LAST OCCR. | REPETITIONS |
|---|--------|-------|------------|-------------|
| 1 | FURNACE | UNIT TRIP | 1-7-04-9:32 | 6 |
| 2 | FILTER | CLOGGED | 1-6-04-23:48 | 10 |
| 3 | AIR | LOW PRESS. | 8-03-03-12:00 | 1 |
| 4 | FURNACE | LOW AIRFLOW | 8-03-03-10:45 | 3 |
| 5 | ZONING | SENSOR | 4-17-03-20:03 | 1 |
| 6 • • • • • | | | | |

FIG.3

ORDERED RECORD OF SYSTEM-WIDE FAULT IN AN HVAC SYSTEM

The present application claims priority to U.S. Provisional Patent Application No. 60/537,765, filed Jan. 20, 2004. The disclosure of this provisional application is incorporated herein in its entirety, by reference.

BACKGROUND OF THE INVENTION

The present invention relates to an HVAC system wherein an ordered record of faults occurring across the system is maintained at a single display location.

Typically, a heating, ventilating, and air conditioning (HVAC) system includes multiple components installed in a building and functioning together in a coordinated manner. Normally, an HVAC system includes an indoor unit (gas furnace or fan coil), an outdoor unit (A/C or heat pump), and a thermostat. Further, more sophisticated systems might have a multi-zone control capacity including a zone control and zone dampers. HVAC systems also frequently include accessories such as filters, humidifiers, and ventilators.

The operation of these multiple units is highly interdependent. A problem at one unit may cause a consequent malfunction at another. As an example, a clogged air filter on a blower can cause furnace airflow reduction, which can cause a furnace high temperature limit to trip. The net result from a homeowner's viewpoint is simply a lack of sufficient heat supply.

During a cooling season, the same clogged filter and consequent reduction in airflow can cause the air conditioning coils to freeze up, which may potentially damage the air conditioning compressor.

Across the many possible combinations and inter-relationships of an HVAC system, there are many other examples of such cause and effect relationships. A service technician coming to a building in response to a problem typically begins with no specific lead as to what the actual problem may be. Sometimes, a reported symptom does not re-occur when the technician is present because conditions may have changed. Even if the technician does observe the symptom, a root cause may be elsewhere within the system.

Thus, technicians typically rely on past experience and guesswork to determine the location of the necessary repair. Frequently, this may result in an improper diagnosis of a problem with the system, and potentially repeated unnecessary replacement of parts in an attempt to correct the system function. This process is unnecessarily time-consuming and costly.

Conventional HVAC systems have not had system-wide fault recordation. Individually, some high-end HVAC components, such as variable speed gas furnaces, maintain an individual fault record for the component itself. While this is somewhat effective, individual component fault records do not pinpoint identification of root problems, and the consequent cause of a subsequent problem.

Accordingly, it is desirable to provide an ordered fault list at a central location within an HVAC system that assists a technician with heretofore unavailable historical data to increase understanding of the faults over a historical time period and permit a relatively rapid diagnosis of the problem source.

SUMMARY OF THE INVENTION

The HVAC system according to the present invention includes a central controller that communicates with a zone control and an indoor unit that communicates with an outdoor unit over a digital communication bus. The bus preferably includes four communication paths that communicate data and power.

The central controller maintains a fault list that includes the source of a fault, a description of the fault, the last occurrence of the fault, and the number of sequential occurrences or repetitions across the entire HVAC system. By maintaining the repetition as a numerical value, a series of identical faults do not overwhelm the list and minimize the diagnostic benefits thereof.

The present invention therefore provides an ordered fault list at a central location within an HVAC system, which assists a technician with heretofore unavailable historical data to increase understanding of the faults over a historical time period and permit a relatively rapid diagnosis of the problem source.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a schematic representation of one fault list menu page according to the present invention.

DETAILED DESCRIPTION OF THE PREFERRED EMBODIMENT

Figure 1:
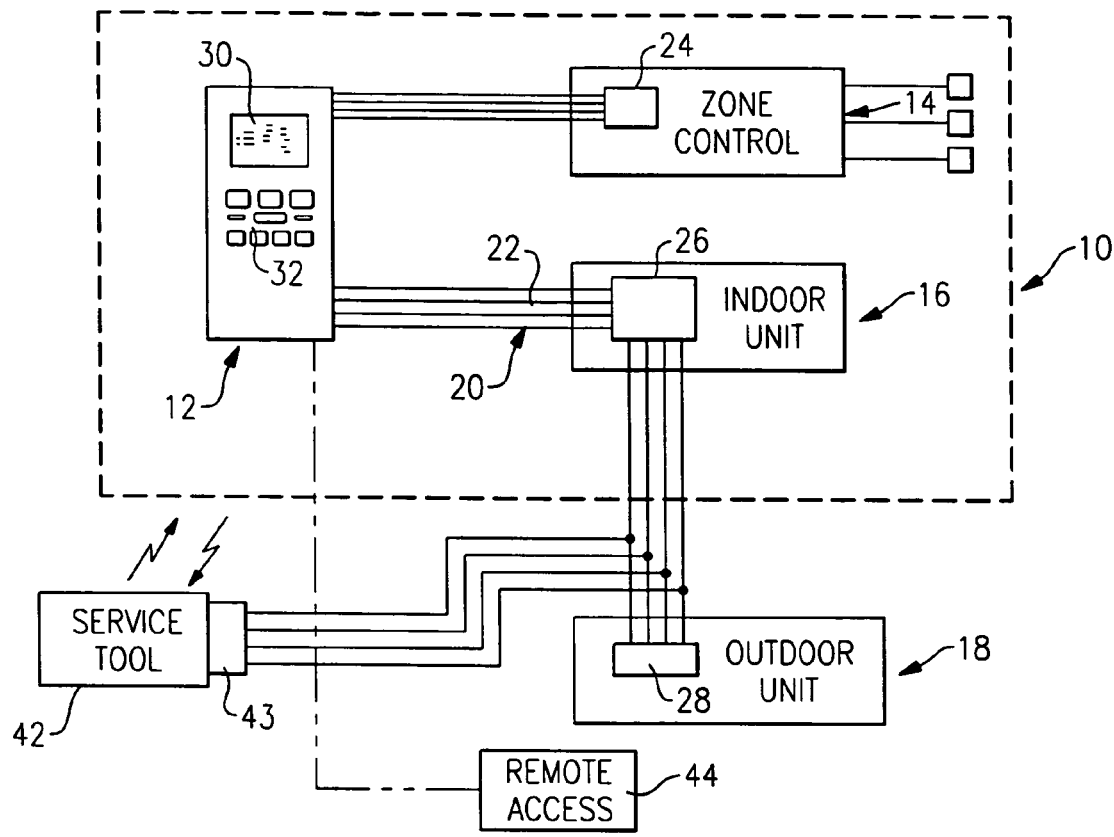
FIG. 1 is a general schematic view of an HVAC system for use with the present invention.

FIG. 1 illustrates a general schematic view of an HVAC system 10. The system 10 generally includes a central controller 12 that communicates with a zone control 14, and an indoor unit 16 that communicates with an outdoor unit 18. The central controller 12 preferably communicates over a digital communication bus 20. The bus 20 preferably includes four communication paths, such as four wires 22 or the like, which communicate data and power. It should be understood that other communication systems will likewise benefit from the present invention.

The zone control 14 preferably provides thermostat controls for each of several zones and a damper control for dampers associated with each of the zones as generally understood. The zone control 14 includes a microprocessor controller 24 that communicates with the central controller 12 over the bus 20. The indoor unit 16 includes an indoor unit microprocessor controller 26, which communicates with the central controller 12 over the bus 20. The indoor unit 16 typically includes a furnace, fan coil, or the like. The outdoor unit 18, such as an A/C unit or heat pump, includes an outdoor unit microprocessor controller 26 which communicates through the indoor unit microprocessor controller 24 to the central controller 12 over the bus 20. That is, each HVAC system component includes a dedicated microprocessor controller 24, 26, 28 which communicates with the central controller 12 over the data bus 20.

It should be understood that although a particular component arrangement and communication bus layout is disclosed in the illustrated embodiment, other arrangements will benefit from the instant invention.

The central controller 12 includes a display 30, such as a LCD or flat panel display, and input devices 32, such as a plurality of buttons, directional keypad, but alternatively including a mouse, keyboard, keypad, remote device or microphone. Alternatively, the display 30 can be a touch screen display.

Figure 2:
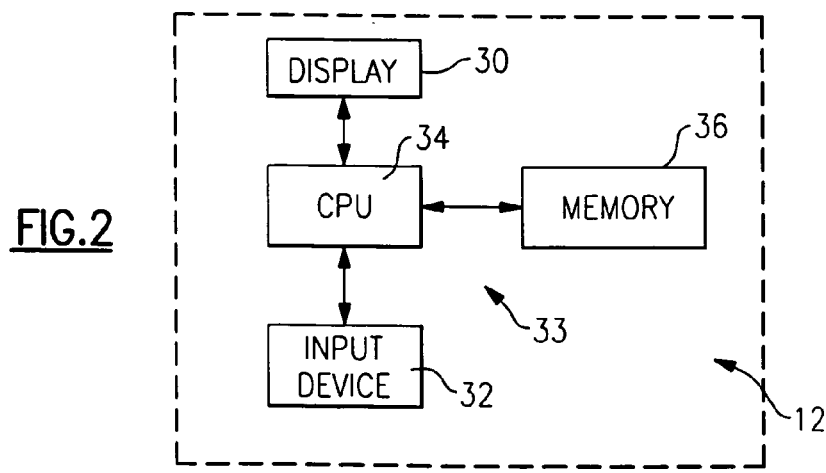
FIG. 2 is a block diagram of a central controller.

The central controller 12 preferably operates as a thermostat for the HVAC system 10 and further includes a computer module 33 connected to the display 30 and input devices 32. The computer module 33 generally includes a CPU 34 and a storage device 36 connected to the CPU 34 (FIG. 2). The storage device 36 may include a hard drive, CD ROM, DVD, RAM, ROM or other optically readable storage, magnetic storage or integrated circuit. The software to control the HVAC system 10 including the thermostat instructions and the instruction for the display 30 and user interface may also be stored in storage device 36 or alternatively in ROM, RAM or flash memory.

As faults occur at individual HVAC system components, a fault signal is sent from the microprocessor controller 24, 26, 28 to the central controller 12 over the bus and the central controller 12 records those faults in the storage device 36 for later display and analysis. The central controller 12 maintains an ordered list for a set number of the most recent faults across the system 20. Preferably at least ten faults are maintained, however, any number may be recorded based upon available memory at the central controller 12.

Referring to FIG. 3, the central controller 12 preferably records a fault list 40. The fault list 40 includes the source of a fault, a description of the fault, the last occurrence of the fault, and the number of sequential occurrences or repetitions. That is, the repetitions are the number of repeated occurrences with no other fault occurring in between. By maintaining the repetition as a numerical value, a series of identical faults do not overwhelm the list and minimize the diagnostic benefits thereof.

The fault list 40 is ordered with the most recent fault at its top, followed by the next most recent, and so on. Multiple, repeated occurrences of the same fault only occupy one record. The number of repeated occurrences is also recorded as described above. Date and time information is also preferably recorded. For repeated occurrences, only the most recent date and time information is recorded in the disclosed embodiment.

The date and time information preferably provides backdating capability. That is, if the correct date and time were not entered at the time of installation or if due to system down time or any reason, the date and time were corrupted, the technician can enter the current date at the time of the service call. The central controller 12 calculates the date and time information in the fault list with respect to the current date and time. In other words, the central controller 12 maintains a time period count of the period since the occurrence of the fault such that date and time information can be reconstructed, if necessary.

As appreciated, the fault list 40 provides a technician with heretofore unavailable historical data to increase understanding of the faults over a historical time period and permit a relatively rapid diagnosis of the actual problem source. For example only, faults 1 and 2 indicate that a filter clog fault occurred shortly before a furnace limit trip occurred. This is indicative of the clogged filter being the problem. Similarly, the low pressure occurring at the air conditioner in fault 3 may well have been caused by the furnace having a low airflow, shown at fault 4. Now, a service technician will be able to quickly pinpoint and likely resolve the actual problem.

The display 30 displays this ordered list of faults to the service technician. Additionally or alternatively, the central controller 12 will selectively upload the fault list to a designated service tool 42 (shown schematically in FIG. 1) that is temporary connected to the system bus 20 at a docking station 43 or the like.

The central controller 12 may alternatively or additionally upload the fault list to a remote access device 44 (shown schematically in FIG. 1) to transmit the information over a telephone line, a wireless network, the internet or other remote communication system.

For further understanding, attention is directed to U.S. Provisional Patent Application No. 60/537765 filed Jan. 20, 2004 which is assigned to the assignee of the instant invention and which is hereby incorporated herein in its entirety.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of diagnosing a HVAC system comprising the steps of:
   (1) monitoring an HVAC component of an HVAC system;
   (2) identifying a fault at a location of the HVAC component with a microprocessor located at the location of the HVAC component, wherein the microprocessor identifies the fault;
   (3) communicating a fault signal representative of the fault to a central controller after said step (2); and
   (4) maintaining an ordered fault list comprising the fault signal at the central controller.

2. A method as recited in claim 1, wherein said step (1) further comprises:
   monitoring a multiple of HVAC components.

3. A method as recited in claim 2, wherein said step (3) further comprises:
   digitally linking the multiple of HVAC components with the central controller.

4. A method as recited in claim 1, wherein said step (4) further comprises:
   ordering the fault list by the most recent fault.

5. A method as recited in claim 1, wherein said step (4) further comprises:
   maintaining a source of the fault within the fault list.

6. A method as recited in claim 1, wherein said step (4) further comprises:
   maintaining a description of the fault within the fault list.

7. A method as recited in claim 1, wherein said step (4) further comprises:
   maintaining a count of sequential occurrences of each fault within the fault list.

8. A method as recited in claim 7, further comprising said step of:
   maintaining a time period of a last occurrence of each of the sequentially occurring faults.

9. A method as recited in claim 1, further comprising said step of:
remotely communicating with the central controller.

10. A method as recited in claim 1, wherein said step (3) further comprises:
communicating the fault signal in response to occurrence of the fault.

11. A method of diagnosing a HVAC system comprising the steps of:
(1) monitoring an HVAC component of an HVAC system;
(2) identifying a fault at a location of the HVAC component with a microprocessor,
(3) communicating a fault signal representative of the fault to a central controller after said step (2); and
(4) maintaining an ordered fault list comprising the fault signal at the central controller, ordering the fault list by the most recent fault, maintaining a time period count of the period since the occurrence of the fault and determining a date that the fault occurred based upon an entered date.

12. A method of diagnosing a HVAC system comprising the steps of:
(1) monitoring an HVAC component of an HVAC system;
(2) identifying a fault at a location of the HVAC component with a microprocessor;
(3) communicating a fault signal representative of the fault to a central controller after said step (2); and
(4) maintaining an ordered fault list compressing comprising the fault signal at the central controller and maintaining multiple repeated occurrences of a common fault as one record.

13. A method as recited in claim 12, further comprising the step of:
displaying the multiple repeated occurrences as a single numerical value.

14. An HVAC system comprising:
a multiple of HVAC components;
a multiple of component microprocessors corresponding to said multiple of HVAC components such that each of said multiple of HVAC components includes a different one of the multiple of component microprocessors, wherein the component microprocessors identify faults at a location of the corresponding HVAC component;
a central controller in digital communication with each of said component microprocessors to receive a multiple of fault signals from each of said multiple of HVAC components and to store an ordered fault list of said fault signals; and
a display in communication with said central controller to display said ordered fault list.

15. The HVAC system as recited in claim 14, wherein said multiple of HVAC components comprise at least one of: an A/C unit, a heat pump, a zone control, a furnace or a fan coil.

16. The HVAC system as recited in claim 14, wherein said central controller comprises a thermostat.

17. The HVAC system as recited in claim 14, wherein said digital communication comprises a four path communication bus.

18. An HVAC system comprising:
a multiple of HVAC components, each of said multiple of HVAC components comprising a component microprocessor that identifies faults at a location of a corresponding HVAC component;
a central controller in digital communication with each of said component microprocessors to receive a multiple of fault signals from each of said multiple of HVAC components and to store an ordered fault list of said fault signals;
a display in communication with said central controller to display said ordered fault list; and
a service tool which selectively communicates with said central controller through a docking station to receive the ordered fault list.

19. An HVAC system comprising:
a multiple of HVAC components;
a multiple of component microprocessors corresponding to said multiple of HVAC components such that, each of said multiple of HVAC components includes a different one of the multiple of component microprocessors, wherein the component microprocessors identify faults at a location of the corresponding HVAC component;
a central controller in digital communication with each of said component microprocessors to receive a multiple of fault signals from each of said multiple of HVAC components and to store an ordered fault list of said fault signals;
a display in communication with said central controller to display said ordered fault list; and
a remote access device which remotely communicates with said central controller to receive the ordered fault list.

20. A method of diagnosing a HVAC system comprising the steps of:
(1) monitoring an HVAC component of an HVAC system;
(2) identifying a fault at a location of the HVAC component with a microprocessor;
(3) communicating a fault signal representative of the fault to a central controller after said step (2) by sending the fault signal to the central controller upon occurrence of the fault; and
(4) maintaining an ordered fault list comprising the fault signal at the central controller.

21. The method as recited in claim 20, wherein said step (3) includes sending the fault signal to the central controller in real time.

22. An HVAC system comprising:
a multiple of HVAC components, each of said multiple of HVAC components comprising a component microprocessor that identifies faults at a location of a corresponding HVAC component;
a central controller in digital communication with each of said component microprocessors to receive a multiple of fault signals from each of said multiple of HVAC components and to store an ordered fault list of said fault signals; and
a display in communication with said central controller to display said ordered fault list, wherein said display displays the multiple of fault signals as a single numerical value.

* * * * *